United States Patent [19]
James et al.

[11] Patent Number: 5,914,453
[45] Date of Patent: Jun. 22, 1999

[54] AIR HANDLER FILTER MONITORING APPARATUS

[76] Inventors: Terry Lynn James, 300 Hwy. 66, Conway, S.C. 29526; Tommy M. Buckley, 3735 Limerick Rd., Myrtle Beach, S.C. 29577

[21] Appl. No.: 09/105,921

[22] Filed: Jun. 27, 1998

Related U.S. Application Data

[63] Continuation-in-part of application No. 08/757,962, Nov. 25, 1996, Pat. No. 5,772,732.

[51] Int. Cl.$^6$ .................................................. B01D 46/00
[52] U.S. Cl. .......................... 95/14; 55/DIG. 34; 95/25; 95/26; 96/401; 96/417; 96/424; 454/229; 454/257; 340/577; 340/628
[58] Field of Search ........................ 55/DIG. 34; 96/424, 96/425, 399, F0R 167, FOR 168, FOR 170, FOR 103, 417, 401, 400; 95/25, 26, 14; 454/257, 342, 229, 239, 256; 340/577, 628

[56] References Cited

U.S. PATENT DOCUMENTS

| | | | |
|---|---|---|---|
| 3,936,284 | 2/1976 | Mason | 55/274 |
| 4,352,349 | 10/1982 | Yoho | 454/239 |
| 4,539,896 | 9/1985 | Thomas | 454/239 |
| 4,726,824 | 2/1988 | Staten | 454/229 |
| 4,818,970 | 4/1989 | Natale et al. | 340/539 |
| 4,827,154 | 5/1989 | Naoyuki et al. | 307/116 |
| 4,928,583 | 5/1990 | Taylor et al. | 454/257 |
| 4,960,041 | 10/1990 | Kiser | 454/229 |
| 4,977,818 | 12/1990 | Taylor et al. | 454/257 |
| 5,154,666 | 10/1992 | Wapner | 454/292 |
| 5,182,542 | 1/1993 | Adelman et al. | 95/25 |
| 5,205,156 | 4/1993 | Asano | 73/38 |
| 5,236,477 | 8/1993 | Kokatsu | 55/274 |
| 5,260,691 | 11/1993 | Shyu | 340/589 |
| 5,290,200 | 3/1994 | Kiser | 454/229 |
| 5,378,254 | 1/1995 | Maly | 55/271 |
| 5,385,031 | 1/1995 | Kizawa et al. | 454/256 |
| 5,428,964 | 7/1995 | Lobdell | 62/176.6 |
| 5,461,368 | 10/1995 | Comer | 340/607 |
| 5,528,229 | 6/1996 | Mehta | 454/229 |
| 5,772,732 | 6/1998 | James et al. | 95/25 |

*Primary Examiner*—Duane S. Smith
*Attorney, Agent, or Firm*—Robert J. Van Der Wall

[57] ABSTRACT

A monitoring apparatus for alerting an operator to the need to change a temperature control system filter includes a mechanism for selecting and setting a primary period of filter use to assure replacement before the filter becomes clogged; a mechanism for counting out the selected primary period; a mechanism for activating a signalling device to signal the operator to replace the filter, absent replacement of the filter; a mechanism for sensing replacement of the filter; a mechanism for resetting the mechanism for counting to begin the counting out the selected primary period again upon replacement of the filter; a mechanism for counting out a secondary period measured from the end of the primary period; a mechanism for shutting down the system at the end of the secondary period absent replacement of the filter; and a mechanism for detecting a fire within the building. The apparatus preferably additionally includes a mechanism for shutting down the temperature control system upon detection of a fire.

20 Claims, 7 Drawing Sheets

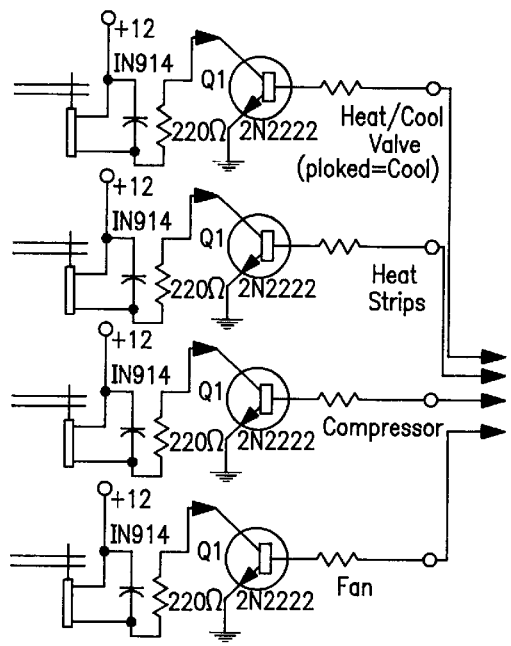
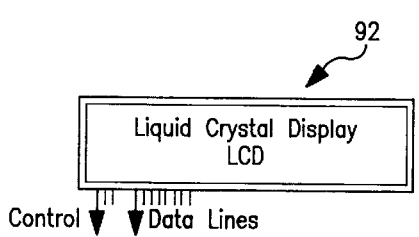
FIG. 5
FIG. 6
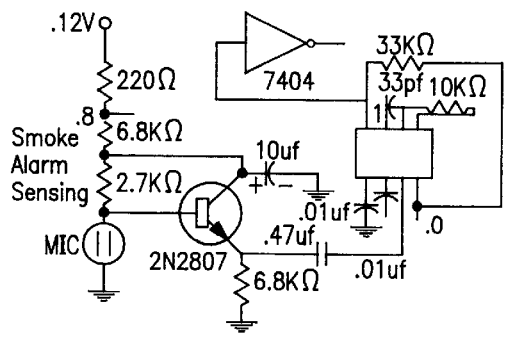
FIG. 7
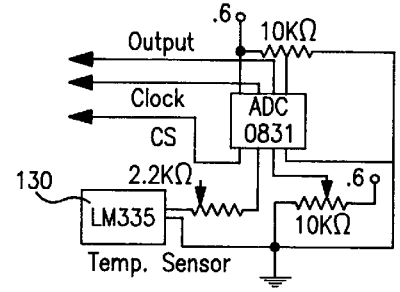
FIG. 9
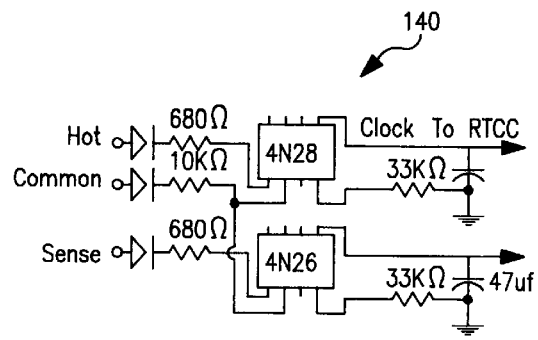
FIG. 10

AIR HANDLER FILTER MONITORING APPARATUS

This application is a continuation-in-part of application Ser. No. 08/757,962 filed on Nov. 25, 1996, now U.S. Pat. No 5,772,732.

BACKGROUND OF THE INVENTION

1. Field of the Invention

The present invention relates generally to the field of air cooling and heating systems and related devices for buildings such as homes. More specifically the present invention relates to a filter status monitoring method and to an apparatus for practicing the method. The apparatus includes an electronic circuit which generates a signal to remind the home owner or service person to replace the filter in the air handler of an attached heating or cooling system, and which shuts down the system to prevent compressor damage. The apparatus further includes fire detection and occupant alerting means; low coolant level, low battery voltage, condensation and open door detection means; computer connection software and emergency telephone call placing means.

2. Description of the Prior Art

There have previously been devices for alerting an operator to the need to change a filter in an air temperature control system. These devices are intended to maximize operating efficiency, and prevent the filter from becoming clogged and thereby damaging the system compressor.

Mason, U.S. Pat. No. 3,936,284, issued on Feb. 3, 1976, discloses an air filtering apparatus using a prefilter and a final filter for filtering air passing through the apparatus. The apparatus includes a chamber having an inlet and an outlet. A first, or prefilter is disposed across the chamber inlet and a second or final filter is disposed across the chamber outlet. A divider, preferably in the form of a wall, is disposed between the two filters and divides the chamber into two adjacent sub-chambers, and this wall has an opening through which air may pass from the first, or inlet, subchamber into the second, or outlet, subchamber. A blower is also disposed between the two filters is provided for forcibly blowing air from the first subchamber into the second subchamber. Mason further provides an integrated signaling device which monitors both filters and independently signals when one or the other of these filters has accumulated sufficient particulates from the air to require replacement. The concentration of particulate matter in the filter is determined by monitoring pressure differential between the high and low sides of each filter. A problem with Mason is that the filter monitoring mechanism is complex and costly.

Lobdell, U.S. Pat. No. 5,428,964, issued on Jul. 4, 1995, reveals a control for an air quality machine. Lobdell monitors in real-time the quality of air in a work or living space, and includes a portable electronic monitoring device which senses and indicates air quality within a given space. Within its housing the device has a particular sensor for detecting the ambient concentration of aerosols and particulates in the space and for comparing the detected level with a predetermined particulates threshold limit value (TLV). When a particulate level is detected above the TLV, an LED illuminates to indicate that the air quality has become marginal or unacceptable. Air passes through mechanical prefilter media for collection of larger airborne contaminants, then through an ionization section and electrostatic charged grid, mesh, or media for removal of microscopic particulates from the air stream. Once again, the pressure differentials between opposing sides of each system filter are monitored to determine when filter changing is needed, as in Mason.

Asano, et al., U.S. Pat. No. 5,205,156, issued on Apr. 27, 1993, teaches a device for detection of the degree of clogging of a dust filter. In Asano, et al., the air speed on the downstream side of a filter is monitored, and when the detected speed reads too low, the filter is to be replaced. The problems of Mason are again presented.

Other related art includes Kokatsu, U.S. Pat. No. 5,236,477, for a microcomputer-based control device; Maly, et al., U.S. Pat. No. 5,378,254, for a filter sensing apparatus and filter; and Comer, U.S. Pat. No. 5,461,368, for an air filter monitoring device in a system using a multi-speed blower. These prior devices all fail to teach selectable monitored time periods for filter replacement and system shut-down if the filter is not replaced to prevent system damage.

It is thus an object of the present invention to provide reminder apparatus and method for alerting an operator to the need to change a system filter and thus prevent resulting service calls.

It is another object of the present invention to provide such an apparatus and method which permit the operator selection of a primary filter replacement period appropriate to the particular system, and which alerts the operator at the end of the primary filter replacement period.

It is still another object of the present invention to provide such an apparatus and method which shut down the system at the end of a secondary filter replacement period to protect the compressor from damage, if the filter is not replaced.

It is a further object of the present invention to provide such an apparatus and method which include an apparatus program providing means for operator testing of the program and signalling mechanisms.

It is a still further object of the present invention to provide such an apparatus which includes means for alerting a building occupant or other appropriate person of a fire, low coolant level, low battery power, an open door or window or condensation in the system condensation pan and, in some instances, shut down the system to protect the system and building.

It is an additional object of the present invention to provide such an apparatus which includes means for connection to and operation from a computer and monitor.

It is finally an object of the present invention to provide such an apparatus which is economical to manufacture, easy to install and operate, and highly reliable.

SUMMARY OF THE INVENTION

The present invention accomplishes the above-stated objectives, as well as others, as may be determined by a fair reading and interpretation of the entire specification.

A monitoring apparatus is provided for alerting an operator to the need to change a temperature control system filter, including a mechanism for selecting and setting a primary period of filter use to assure replacement before the filter becomes clogged; a mechanism for counting out the selected primary period; a mechanism for activating a signalling device to signal the operator to replace the filter, absent replacement of the filter; a mechanism for sensing replacement of the filter; a mechanism for resetting the mechanism for counting to begin the counting out the selected primary period again upon replacement of the filter; a mechanism for counting out a secondary period measured from the end of the primary period; a mechanism for shutting down the system at the end of the secondary period absent replacement of the filter; and a mechanism for detecting a fire within the building.

The apparatus preferably additionally includes a mechanism for alerting a building occupant of a fire upon detection of the fire by the detecting means. The apparatus preferably still further includes a mechanism for shutting down the temperature control system upon detection of a fire.

The mechanism for detecting a fire optionally includes a measuring mechanism and a mechanism for storing and comparing a preset temperature measurement to temperatures measured by the temperature measuring mechanism. The temperature measuring mechanism may include a thermostat or a thermometer.

The mechanism for detecting a fire optionally includes smoke detection mechanism. Where the building includes a building fire alarm which emits a sound upon detection of a fire, the mechanism for detecting a fire may include a device for detecting the sound emitted by the building fire alarm.

Where the temperature control system includes a coolant having a coolant level, the apparatus preferably additionally includes a coolant level measuring mechanism and a mechanism for storing and comparing a preset coolant level measurement to coolant levels measured by the coolant level measuring mechanism, and a mechanism for alerting a building occupant of a measured coolant level below the preset coolant level measurement. The coolant level measuring mechanism typically includes a freon sensor.

Wherein the temperature control system includes a condensation pan, the apparatus preferably additionally includes a mechanism for detecting condensation within the condensation pan; a mechanism for alerting a building occupant of condensation within the condensation pan upon detection of condensation; and a mechanism for shutting down the temperature control system upon detection of condensation.

Where the building has a door or window which can be pivoted into an open position, the apparatus preferably additionally includes a mechanism for detecting the door or window in the open position; a mechanism for alerting a building occupant of the open position of the door or window; and a mechanism and a mechanism for starting a timing cycle programmed with a preset time and a mechanism for shutting down the temperature control system when the door or window is in the open position for the preset time. The mechanism for detecting when the door or window is in the open position optionally includes an RF transmitter for generating a signal, the RF transmitter being mounted on the door or window, and a signal receiver unit mounted on the apparatus for receiving the signal. The mechanism for detecting when the door or window is in the open position optionally includes an infrared light radiating and receiving device, or a sound generating and receiving device.

Where the apparatus additionally includes apparatus controls, the apparatus preferably additionally includes a computer and monitor; a mechanism for operationally connecting the computer and monitor to the apparatus; and a program within the computer for operating the apparatus controls through the computer and monitor. The apparatus may additionally include a telephone connection structure; a memory for storing a telephone number; and a mechanism for automatically dialing the telephone number on the telephone upon detection of a fire. Where the apparatus includes a battery with a power level, the apparatus may additionally include a mechanism for monitoring the power level in the battery; a mechanism for storing and comparing a preset battery power level measurement to power levels measured by the mechanism for monitoring the power level; a mechanism for alerting a building occupant of a power level below the preset power level measurement; and a mechanism for shutting down the temperature control system upon detection of a power level below the preset power level measurement.

BRIEF DESCRIPTION OF THE DRAWINGS

Various other objects, advantages, and features of the invention will become apparent to those skilled in the art from the following discussion taken in conjunction with the following drawings, in which:

FIG. 5 is a schematic diagram of the liquid crystal display circuit.

FIG. 6 is a schematic diagram of part of the apparatus circuit.

FIG. 7 is a schematic diagram of the smoke alarm sensing circuit.

FIG. 9 is a schematic diagram of temperature sensing circuit.

FIG. 10 is a schematic diagram of the coolant sensing circuit.

DETAILED DESCRIPTION OF THE PREFERRED EMBODIMENTS

Figure 1:
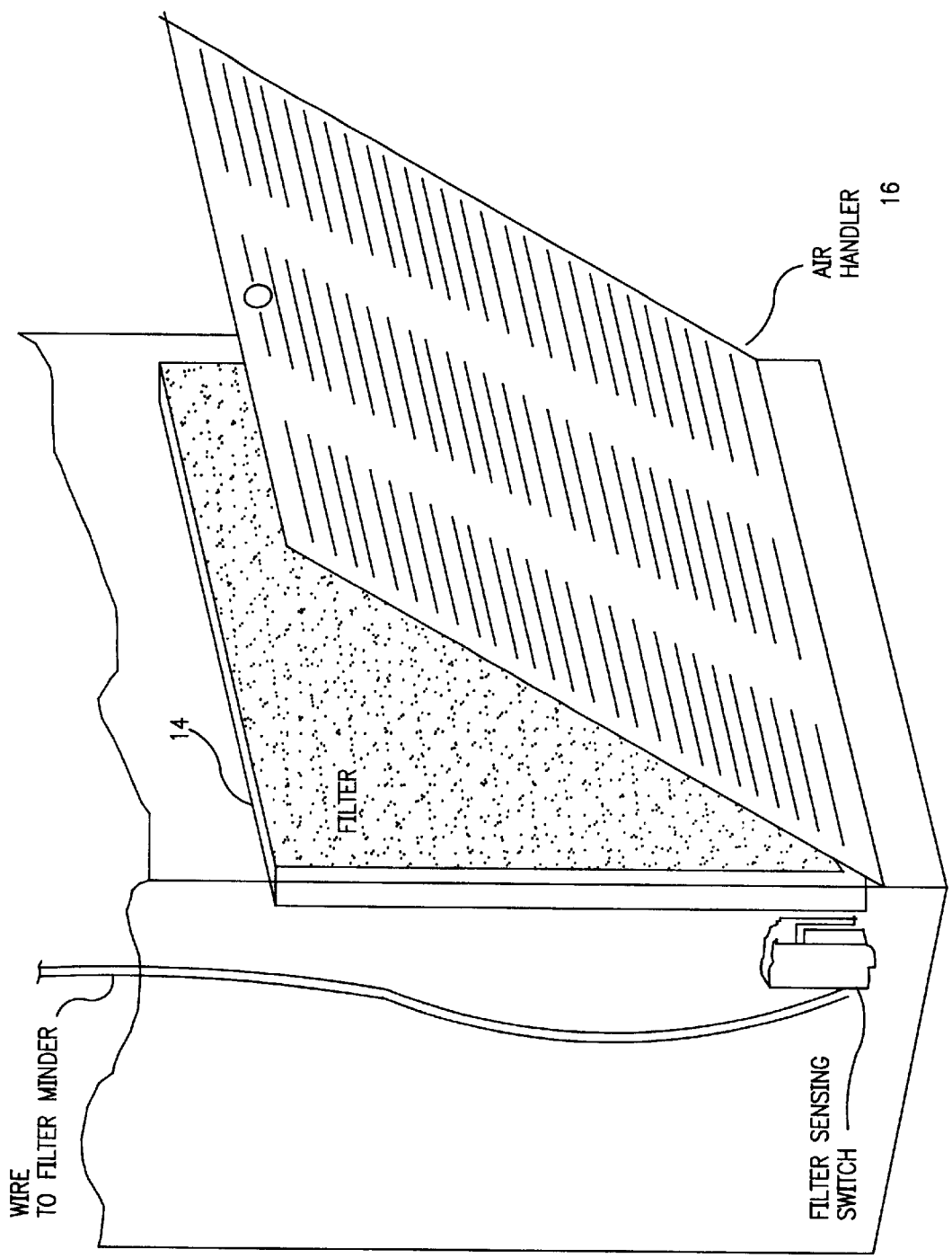
FIG. 1 is a perspective view of the filter handler and filter of an air temperature control system.

As required, detailed embodiments of the present invention are disclosed herein; however, it is to be understood that the disclosed embodiments are merely exemplary of the invention which may be embodied in various forms.

Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various Figures are designated by the same reference numerals.

Apparatus

Figure 2:
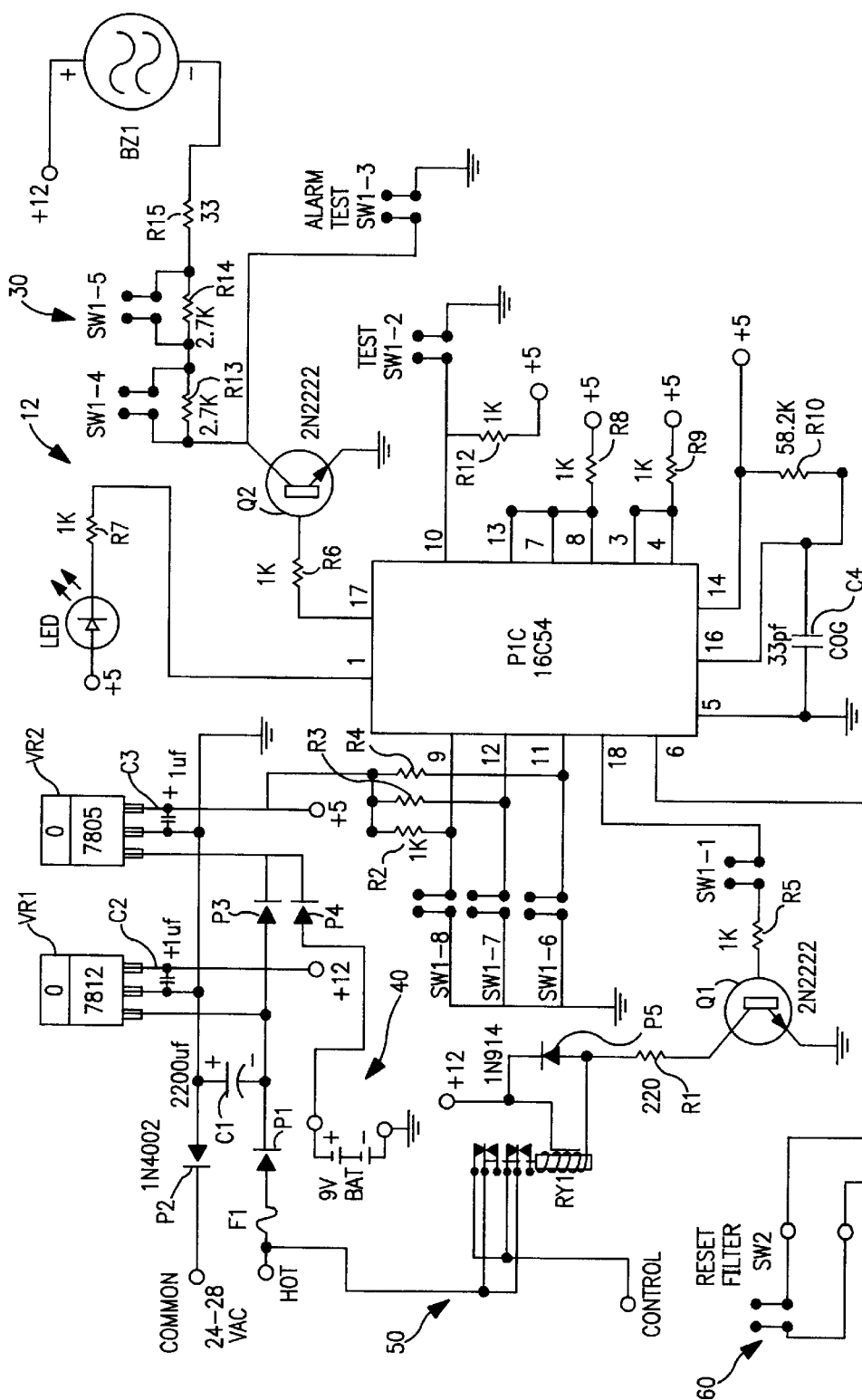
FIG. 2 is a schematic diagram of the inventive circuit of the apparatus preferred embodiment.
Figure 3:
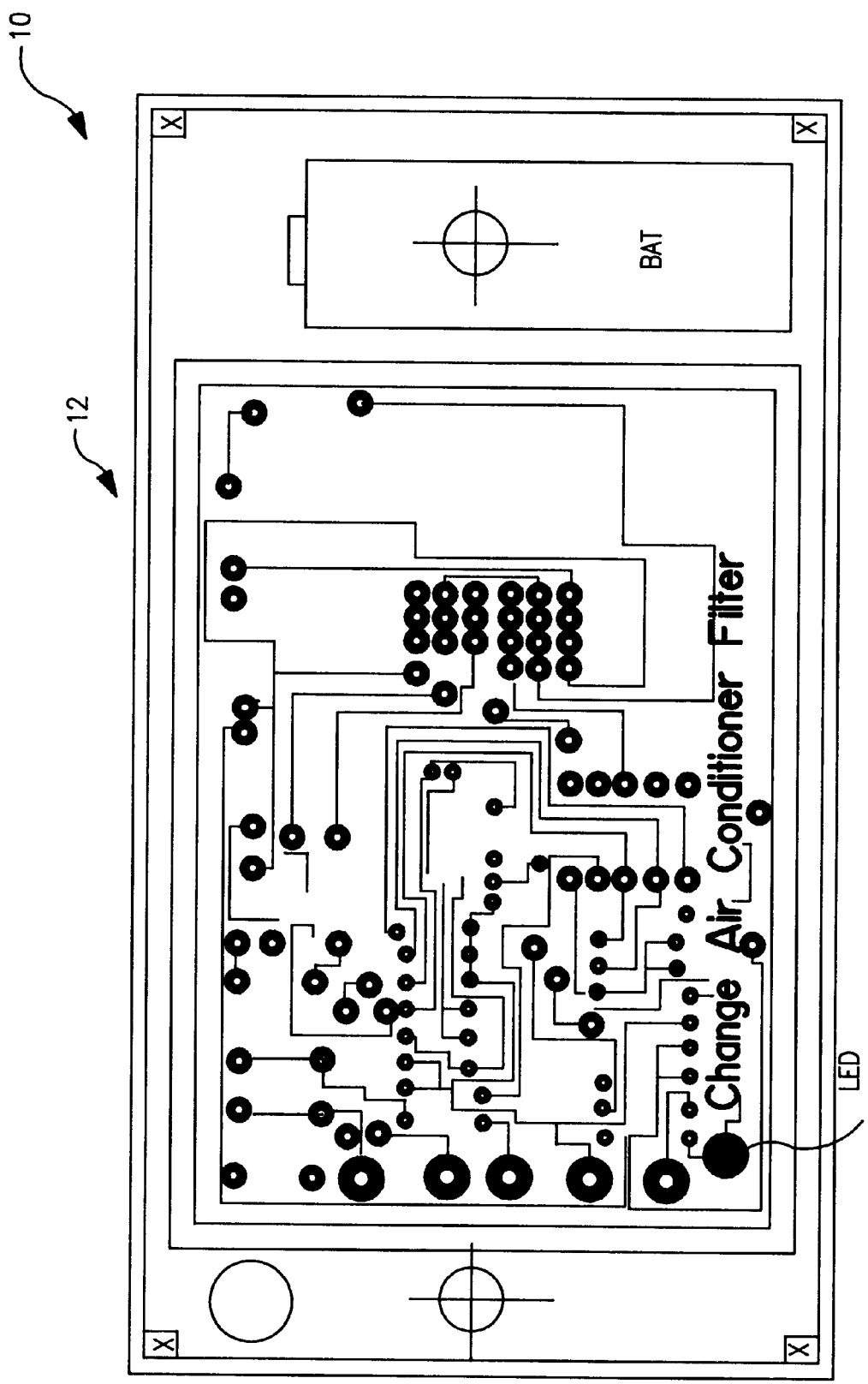
FIG. 3 is a plan view of the physical structure of the inventive circuit of FIG. 2.
Figure 4:
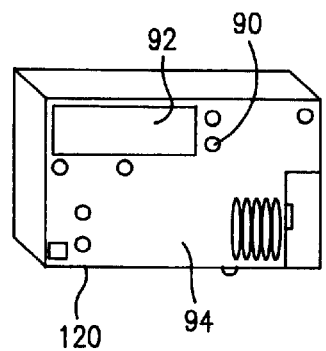
FIG. 4 is a perspective view of the apparatus showing several of the preferred additional features such as the temperature sensor, apparatus controls and liquid crystal display.
Figure 8:
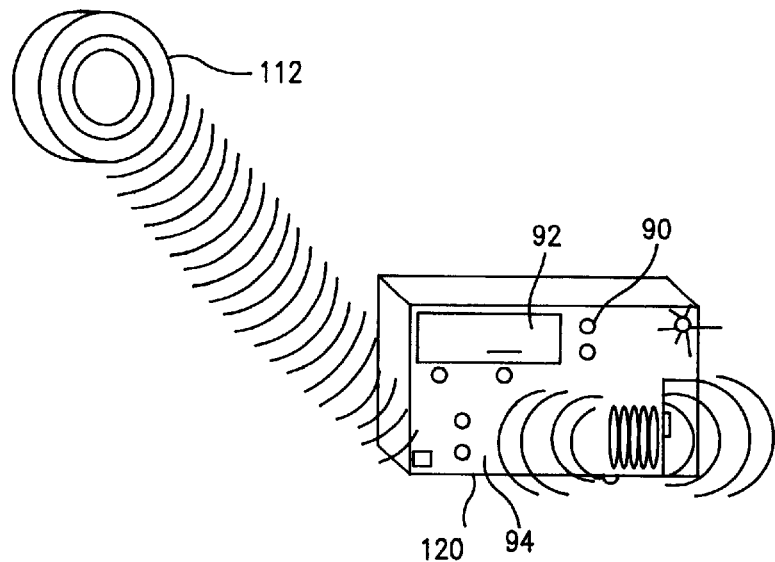
FIG. 8 is a perspective view of the apparatus and a building smoke alarm emitting an alarm sound detected by the apparatus.
Figures 11, 12:
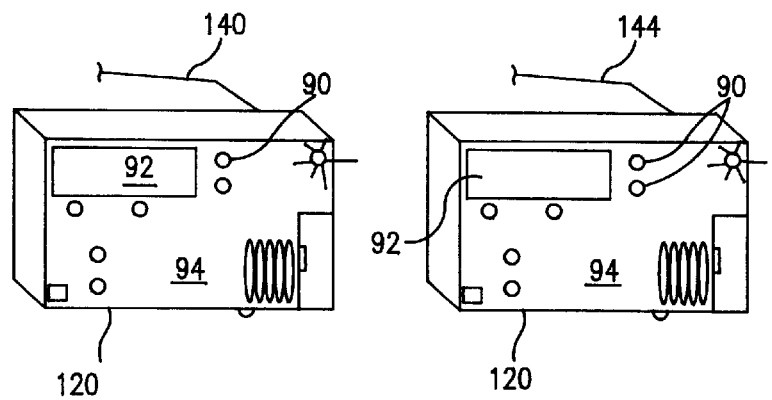
FIG. 11 is a perspective view the apparatus with a protruding coolant sensing wire.
FIG. 12 is a perspective view the apparatus with a protruding condensation sensing wire.
Figure 13:
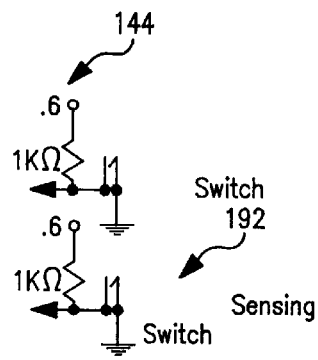
FIG. 13 is a schematic diagram of the condensation detecting float switch circuit.
Figure 14:
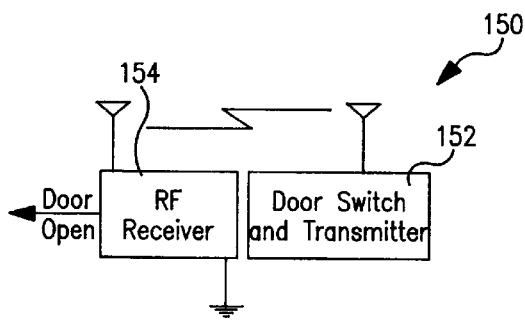
FIG. 14 is a schematic diagram of the open door detecting circuit.
Figure 17:
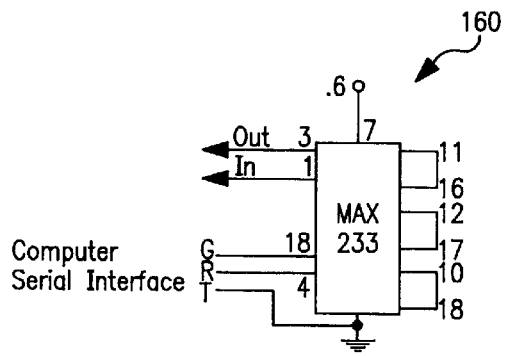
FIG. 17 is a schematic diagram of the computer serial interface forming part of the connecting means.
Figure 18:
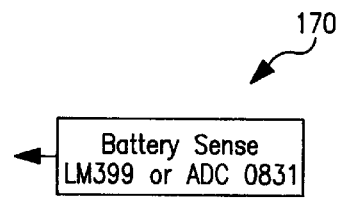
FIG. 18 is a schematic diagram of the battery sensing circuit.
Figure 19:
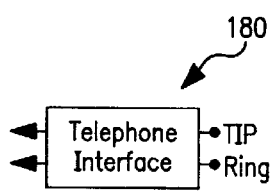
FIG. 19 is a schematic diagram of the telephone interface circuit.

Referring to FIGS. 1–3, a filter monitoring apparatus 10 is disclosed including an electronic comprehensive circuit 12 for generating a signal to remind the home owner or service person, hereinafter the operator, to replace a filter 14 in the air handler 16 of an attached air heating or cooling system 20. Apparatus 10 generates a filter replacement reminder signal at the end of an operator-selected primary period, measured from the moment of filter installation, and shuts down the system at the end of a secondary period, measured from the end of the primary period and of shorter duration, if the filter 14 is not replaced.

Comprehensive circuit 12 preferably includes a transformer TR which reduces standard household ac voltage to a magnitude suitable for powering the comprehensive circuit 12. Electric current leaving transformer TR passes through a fuse F1 for protecting circuit 12 against overloads. The AC voltage is then converted to DC voltage by diodes D1 and D2, and the resulting rough DC voltage is smoothed by capacitor C1.

Comprehensive circuit 12 is made up of circuit portions for performing specific functions within apparatus 10, including annunciator circuit 30, battery circuit 40, power circuit 50 and reset circuit 60. Two working DC voltages are required by portions of circuit 12. Five volts are required to power a programmable integrated circuit PIC, preferably a 16C54 chip, and a light emitting diode LED, one of the signalling mechanisms. Twelve volts is required to power a relay functioning as annunciator circuit 30 including a buzzer BZ1. These voltages are provided by a first voltage regulator VR1, preferably a number 7812, for producing 12 volts and a second voltage regulator VR2, preferably a number 7805, for producing 5 volts, by limiting the DC voltages to these first and second levels. Tantalum capacitors C2 and C3 at the base of first and second voltage regulators VR1 and VR2 are needed to assist these regulators in thus limiting the voltages.

Battery circuit 40 is included in circuit 12 to prevent loss of data in integrated circuit PIC in the event that household power is interrupted. Circuit 40 includes a battery BAT is used as a back-up to keep the comprehensive circuitry 12 count cycles current. When running on battery BAT, buzzer BZ1 does not sound and the related relay does not energize, but other parts of the logic function normally and the diode LED lights. Battery circuit 40 includes a standard 9 volt battery BAT which delivers a positive 9 volts through a diode D4 to the input terminal of second voltage regulator VR2 to keep integrated circuit PIC functioning and holding data. Diode D4 also prevents voltages from the normally operating power circuit 50 from charging battery BAT, which is non-rechargeable. To prevent undue drain on battery BAT, diode D3 blocks battery BAT voltage from reaching the first voltage regulator VR1, because regulator VR1 powers components of lesser importance.

The heart of comprehensive circuit 12 is integrated circuit PIC, which is a low cost chip containing a microprocessor for doing calculations, RAM (random access memory) for use as a processor work area and ROM (read only memory) which contains a control program for all of the total circuits input and output logic functions. The source code of the control program is as follows:

```
*********************** PIC16C5X Header **********************
PIC54   equ   $1FF ; Define Reset Vectors
;PIC55  equ   $1FF
;PIC56  equ   $3FF     ;
;PIC57  equ   $7FF
;
RTCC    equ   1
PC      equ   2
```

```
        STATUS equ  3   ; f3 Reg is STATUS Reg.
        FSR equ  4
        ;
        PORT_A equ 5
  5     PORT_B equ 6    ; T/O Port Assignments
        PORT_B equ 7    ; PORT_C NOT USED ON C54 PIC

******************** Data RAM Assignments **********************
        TEMP  EQU 7 ;USED IN RESET -WAS PORT_C - NOT IN USE ON 16C54 PIC
        TEMP2 EQU 8 ;USED IN RESET
 10     TEMP3 EQU 9 ;USED IN LOOP1 & ALARM - 15 SEC COUNTER
        TEMP4 EQU 10 ;USED IN LOOP1 & ALARM - 15 SEC COUNTER
        TEMP5 EQU 11 ;USED IN LOOP1 & ALARM - 15 SEC COUNTER
        ;
        TEMP EQU 12
 15     TEMP EQU 13
        TEMP EQU 14
        ;
        ;COUNTERS 15-21 ARE SPARES *******************
        ;
 20     CNE1 EQU 22
        CNE2 EQU 23 ;COUNTERS FOR NORMAL EXECUTION
        CNE3 EQU 24
        ;
        CP1 EQU 25
 25     CP2 EQU 26
```

```
        CP3 EQU 27
        ;
        AL1 EQU 28
        AL2 EQU 29 ;ALARM - CHANGING COUNTERS
 5      ;
        PAL1 EQU 30 ;PERMANENT ALARM COUNTERS
        PAL2 EQU 31
        ;
        ;******************************************************************
10      ; THIS CROSS ASSEMBLER USES MOTOROLA CONVENTIONS
        ;
        ; * = CURRENT PC
        ; ' ' = CHARACTER LITERAL
        ; % = BINARY CONSTANT
15      ; $ = HEX CONSTANT
        ;******************************************************************
        ;
            ORG   0
        ;
20      ; NEW PROGRAM
        ;
        RESET
            MOVLW $0   ;SET FOR OUTPUT 0,1,2, AND 3
            TRIS  PORT_A
25          MOVLW $9E
            TRIS  PORT_B
```

```
            MOVLW   $03
            MOVLW   TEMP
    RES1
            MOVLW   $03
 5          MOVWF   TEMP2
    RES2
            MOVLW   $03
            MOVWF   TEMP2
    RES2
10          GOTO    TEST
    RES3
            DECFSZ  TEMP2
            GOTO    RES2
            DECFSZ  TEMP
15          GOTO    RES1
    INIT
            BTFSC   PORT_B,0    ;SKIP IF BIT IS CLEAR - FILTER MISSING
            GOTO    LOOP1       ;FILTER IS IN
            GOTO    EXIT3       ;FILTER IS IN
20  TEST                        ;READ TEST SWITCH FOR FASTER COUNT
            BTFSC   PORT_B,4    ;SKIP IF HIGH    ON = ONE
            GOTO    L15
            MOVLW   $01
            MOVWF   CP1
25          MOVLW   $01
            MOVWF   CP2
```

```
                MOVLW   $02     ;       } LOAD COUNTERS FOR TEST
                MOVWF   CP3
                GOTO    RES3
        L15
5               BTFSC PORT_B,3 ;READ SWITCH,GOTO 30 IF SW OFF/ZERO
                GOTO L30
                MOVLW $0F
                MOVWF CP1
                MOVLW $04
10              MOVWF CP2
                MOVLW $E1       ;       } LOADS 15 COUNTERS
                MOVWF CP3
                GOTO  RES3
        L30
15              BTFSC PORT_B,6 ;READ SWITCH, GOTO 45 IF SW OFF/ZERO
                GOTO L45
                MOVLW $1E
                MOVWF CP1
                MOVLW $04
20              MOVWF CP2
                MOVLW $E1       ;       } LOADS 30 COUNTERS
                MOVWF CP3
                GOTO  RES3
        L45
25              BTFSC PORT_B,5 ;READ SWITCH, GOTO ASSUME 60 (A60)
                GOTO A60
```

```
            MOVWF $2D       ;COUNTER 1 AMT
            MOVWF CP1
            MOVLW $04       ;COUNTER 2 AMT
            MOVWF CP2
 5          MOVLW $E1       ;COUNTER 3 AMT     } LOADS 45 COUNTERS
            MOVWF CP3
            GOTO RES3
      A60
            MOVLW $3C       ;COUNTER 1 AMOUNT      LSD
10          MOVWF CP1       ;
            MOVLW $04       ;COUNTER 2 AMOUNT
            MOVWF CP2
            MOVLW $E1       ;COUNTER 3 AMOUNT     } LOADS 60 COUNTERS
            MOVWF CP3
15          GOTO RES3
      ;
      ;****************************************************************
      ;                    M A I N   L O O P
      ;****************************************************************
20    LOOP1                 ;NORMAL COUNT LOOP
            BSF PORT_A,2    ;TURNS LED OFF
      CT1
            MOVF CP1,0
            MOVWF CNE1
25    CT2
            MOVF CP2,0
```

```
            MOVWF CNE2
    CT3
            MOVF  CP3,0
            MOVWF CNE3
    MINUTE
            MOVLW $D1           ;START OF 15 SECOND COUNTER
            MOVWF TEMP3
    MIN1
            MOVLW $D1           ;FINE TUNE FOR EXACTLY 15 SECONDS
            MOVWF TEMP4
    MIN2
            MOVLW $05
            MOVWF TEMP5
    MIN3
            BTFSS PORT_B,O      ;RESET SWITCH CHECK
            GOTO EXIT3          ;EXIT IF SWITCH IS CLEAR
            DECFSZ TEMP5
            GOTO MIN3
            DECFSZ TEMP4
            GOTO MIN2
            DECFSZ TEMP3
            GOTO MIN1
            NOP                 ;END OF 15 SECOND COUNTERS
            DECFSZ CNE3         ;COUNTER DEC - 3 LEVELS
            GOTO MINUTE
            DECFSZ CNE2
```

```
                GOTO CT3

DEFFSZ CNE1

GOTO CT2

NOP                 ;DONE
     5          ;
                ;****************************************************************
                ;                       A L A R M
                ;****************************************************************;
                ;
    10  LOOP2                       ;ALARM LOOP - 3 DAYS - ADJUSTABLE
                BTFSS PORT_B,0      ;SKIP IF RESET SW IS GROUNDED
                GOTO EXIT3
                BTFSS PORT_B,4      ;IS TEST SWITCH ON?  CLR-OFF - NO TEST
                GOTO TEST1          ;SWITCH IS SET,YES-GOTO TEST
    15  DAYSX3
                MOVLW $90           ;SWITCH IS CLEAR - NO TEST
                MOVWF PAL1
                MOVLW $78
                MOVMF PAL2          ;THESE ARE NORMAL OPERATION VALUES
    20          GOTO ALARM
        TEST1
                MOVLW $01
                MOVWF PAL1
                MOVLW $01
    25          MOVWF PAL2
        ALARM
```

```
            MOVF PAL2

MOVWF AL2

LOAD1A

MOVF PAL1

5          MOVWF AL1

;------------------------------------------------------------------

MINUTEB

MOVLW $1B           ;START OF 15 SECOND COUNTER

MOVWF TEMP3

10    MIN1B

BTFSS PORT_A,2      ;IS THE LED OFF

GOTO LEDOFF         ;IT IS NOT, SO BRANCH TO LED OFF

BCF PORT_A,2        ;IT IS OFF,SO TURN LED ON

BSF PORT_A,0        ;ALSO TURN ON ALARM

15          GOTO LEDFIN

LEDOFF

BSF PORT_A,2        ;TURN LED OFF

BCF PORT_A,0        ;TURN ALARM OFF - TOGGLES

LEDFIN

20          MOVLW $60

MOVWF TEMP4

MIN2B

MOVLW $60           ;FINE TUNE FOR EXACTLY 15 SECONDS

MOVWF TEMP5

25    MIN3B

BTFSS PORT_B,O      ;RESET SWITCH TEST
```

21

```
            GOTO    EXIT3
            DECFSZ TEMP5
            GOTO MIN3B
            DECFSZ TEMP4
 5          GOTO MIN2B
            DECFSZ TEMP3
            GOTO MIN1B
            NOP                     ;END OF 15 SECOND COUNTER
            ;-----------------------------------------------------------------
10     DEC2
            BTFSS PORT_B,O          ;SKIP IF RESET SWITCH IS NOT GROUNDED
            GOTO EXIT3              ;RESET SWITCH IS GOUNDED
            DECFSZ AL1              ;RESET IS HIGH - NO RESET
            GOTO  DEC2
15          DECRSZ AL2
            GOTO LOAD1A             ;COUNT SATISFIED FOR TEST OR NORMAL OP.
            ;

;****************************************************************
            ;                       R E L A Y
20          ;****************************************************************
            ;
            LOOP3                   ;RELAY PICKED LOOP
                BSF  PORT_A,1       ;PICK RELAY
                MOVLW $20
25              MOVWF CNE2          ;SET C2 RATE OF BLINK/CHIRP
```

```
        L3A
                MOVLW $20
                MOVWF CNE1              ;SET C1 RATE OF BLINK/CHIRP
        L3B
 5              BTFSS PORT_B,0          ;SKIP IF RESET SWITCH IS NOT GROUNDED
                GOTO EXIT3              ;RESET IS GROUNDED
                DECFSZ CNE1
                GOTO L3B
                DECFSZ CNE1
10              GOTO L3B
                DECFSZ CNE2
                GOTO L3A
                BTRFSS PORT_A,2         ;SKIP IF LED IS OFF
                GOTO RELOFF
15              BSF PORT_A,0            ;TURN ALARM ON
                BCF PORT_A,2            ;TURN LED IN
                GOTO LOOP3
        RELOFF
                BCF PORT_A,0            ;TURN ALARM OFF
20              BSF PORT_A,2            ;TURN LED OFF
                GOTO LOOP3
        ;-----------------------------------------------------------------
        EXIT3
                BSF OPRT_A,1            ;RELAY STILL ON - REFRESHED
25              BCF PORT_A,2            ;LED ON SOLID (OPPOSITE STATE DRIVES
           LED) BTFSS PORT_B,0          ;SKIP OF RESET SWITCH IS NOT GROUNDED
```

```
        GOTO EXIT3       ;RESET IS GROUNDED
        BCF PORT_A,1     ;RESET OFF -- FILTER IS BACK IN
        BSF PORT_A,2     ;LED OFF -OPPOSITE STATE
        BCF PORT_A,0     ;ALARM OFF
5       GOTO RESET
;----------------------- END OF PROGRAM -------------------------
```

Pins 1–18 extend from integrated circuit PIC and are connected to various portions of circuit 12 to perform specific functions, as follows:

Pin 1 is an output that controls the light emitting diode LED, and resistor R7 limits the current used by diode LED. Diode LED already has 5 volts allied to its anode. Pin 1 sends the signal ground to the cathode to make diode LED light, and thereby function as a visual indicator to the operator.

Pin 17 drives the annunciator circuit 30 containing buzzer BZ1 by sending ground signal pulses to the negative terminal of buzzer BZ1. Buzzer BZ1 is constantly connected to 12 volts on its other terminal unless buzzer BZ1 is operating on battery power. Resistor R15 limits the maximum current to buzzer BZ1. Switches 1–4 and 1–5 on switch bank 1 control the current level reaching buzzer BZ1 to permit the operator to tune a desired loudness of the buzzer by either switching in or bypassing resistors R13 and R14. Transistor Q2 permits annunciator circuit 30 to function by passing the ground signal to buzzer BZ1 when the signal at pin 17 goes high. Resistor R6 is a current limiting resistor for transistor Q2. Switch 1–3 of this leg of annunciator circuit 30 causes buzzer BZ1 to continuously sound if closed. Switch 1–3 is used to activate buzzer BZ1 alarm buzzer during installation to test its loudness.

Pin 10 is an input which is normally tied high by the 5 volts level coming through resistor R12. Closing test switch 1–2 sends a ground level voltage to integrated circuit PIC and signals it during testing or installation to run a program simulating all functions in a span of less than one minute.

Pins 13, 7 and 8 are unused and must be tied to a high signal level of +5 volts through resistor R8. Pins 3 and 4 are unused and must be tied to a high signal level of +5 volts through resistor R9.

Pins 5, 16 and 14 work in conjunction with capacitor C4 and resistor R10 to set up the timing clock TC for integrated circuit PIC. The clock TC speed is several thousand cycles per second. Pin 14 is also the +5 volts power input and pin 5 is the supply ground for integrated circuit PIC. Capacitor C4 is a type of capacitor that holds its value when subjected to temperature changes, and resistor R10 is a type of resistor that has a more critical value (within 1%) than normal resistors.

Pin 6 is an input which resets integrated circuit PIC when it is grounded through switch 2. Switch 2 is not on comprehensive circuit 12 mounting board, but is mounted to the system in such a way that the filter 14 for the system air return holds switch 2 open. Removing the filter 14 to change it resets this reset circuit 60. Leaving filter 14 out of air handler 16 causes this reset circuit 60 to disable all functions of the thermostat when switch 1—1 is on. Switch 2 is a normally closed switch, held open by the presence of the filter 14 in the air handler 16.

Pin 18 is an output which drives transistor Q1 through resistor R5 into a state that allows a voltage ground, through limiting resistor R1, to reach the pick coil of relay RY1. Diode D5 prevents feed back of current into transistor Q1 when the voltage ground is removed and the pick coil voltage relaxes. Switch 1—1 of this leg provides a method of turning off this feature of picking the relay RY1. When relay RY1 is picked, the normally closed contacts of relay RY1 are opened and 24–28 VAC is removed from the thermostat, thereby preventing operation of the attached air heating or cooling system. Relay RY1 is preferably a 12 VDC type. The connection labeled CONTROL in FIG. 2 controls the thermostat. There are two sets of contacts in relay RY1 and they are used in parallel to permit longer contact life if high thermostat currents are experienced through these points.

Pins 9, 11 and 12 control the duration of the primary period. Pin 9 is held high (+5 volts) by resistor R2. If switch 1–8 is closed, a ground signal is provided to integrated circuit PIC to signal a primary period duration of 15 days. Pin 12 is held high (+5 volts) by resistor R3. If switch 1–7 is closed, a ground signal is provided to integrated circuit PIC to signal a primary period duration of 30 days. Pin 11 is held high (+5 volts) by resistor R4. If switch 1–5 is closed, a ground signal is provided to the integrated circuit PIC to signal a primary period duration of 45 days. When none of the timing switches is closed, a default value of 60 days primary period duration will occur. Comprehensive circuit 12 operates on standard household 24–28 VAC power which is commonly used to operate a system thermostat. Circuit 12 draws very low levels of current during its operation.

Additional Features

Apparatus 10 includes control buttons 90 and an LCD (Liquid Crystal Display) 92. See FIGS. 4–20, and FIGS. 4 and 5 specifically. For all of the following features, the arrangement of apparatus 10 operator panel 94 input switches remains unaltered. The power supply remains high at plus five and plus twelve volts, and a line is still held high by five volts and a resistor. Closing the switch (not shown) forces the line to ground, the PIC senses this and the program responds. Two PIC's (Programmable Integrated Circuits) are preferably used to accommodate additional I/O lines for the increase in features. The same architecture is used in the larger capacity 16C57. See FIG. 6.

A smoke and fire detection and shutdown assembly 110 is preferably provided. Assembly 110 detects the presence of smoke, preferably through connection to an ordinary smoke detector 112, and displays a message alerting occupants of the building to the apparent condition. See FIG. 8. This would require modification of a smoke detector such as with a kit from the alarm manufacturer, to add means for signaling apparatus 10 of the presence of smoke. See FIG. 7. Where no fire is actually present, the occupant operates controls 90 on apparatus 10 to deactivate the alert. In the event that the alert is not deactivated, apparatus 10 shuts off all air moving circuits in the attached air heating or cooling system which could fan flames and accelerate a fire.

Several alternative fire detection mechanisms may be employed. One alternative is hard wiring, for which the manufacturer provides a connection that electrically interfaces with apparatus 10 to signal the presence of smoke. Still another approach is to provide apparatus 10 with listening capabilities which are trained to listen for the distinct sound produced by an activated smoke detector 112. See FIG. 8. Upon detecting this unique tone, apparatus 10 shuts down the attached air heating or cooling system by cutting off the system control voltage, once again to prevent air circulation from accelerating the fire. Slowing the advancement of the fire keeps the property more intact until firefighters arrive, thereby reducing losses. A still further alternative mechanism is a temperature measuring device 120, or infrared sensing means, which detects heat levels indicative of a fire. The temperature measuring device is calibrated to signal an alert when measured temperatures rise beyond the normal range produced by equipment and human body heat in the building.

An electronic thermostat 130 is preferably provided for detecting fires and other hazardous conditions which might damage apparatus 10 as well as the building which houses apparatus 10. See FIG. 9. Thermostat 130 senses abnormal heat and shuts down apparatus 10. Thermostat 130 preferably includes a dual PIC configuration containing a burned-in set of instructions. It is the PIC which permits apparatus 10 to function both as a thermostat and as a multi-hazard-sensing unit. Apparatus 10 preferably also displays the number of days remaining until the air conditioning filter 14 needs to be changed, when the building occupant presses the apparatus 10 control buttons 90. While the occupant is performing this task, he or she is in a position to view the apparatus 10 liquid crystal display (LCD) 92.

A low freon sensing and alerting device 140 is preferably provided to detect and alert the building occupant of an inadequate freon level in the attached air heating or cooling system. See FIGS. 10 and 11. Such an alert permits service representatives to be called in time to prevent compressor damage in the exterior portion of the attached air heating or cooling system. Device 140 preferably includes a sense line for the 24–28VAC in the form of an extra wire (not shown) placed within a normal bundle of wires extending between the thermostat 130 and the outside portion of the attached air heating or cooling system. A lack of voltage in the sense line indicates that freon in the attached air heating or cooling system is low, and that system should not be operated.

A condensation sensing device 144 is also preferably provided to detect and alert a building occupant to an accumulation of liquid in a condensation pan in the base of the air handler 16. See FIGS. 12 and 13. This condition results most often from a blocked drain pipe, and often causes water soaking damage to building sheet rock, which is costly to repair. The alert permits the building occupant to summon a service person to correct the problem before substantial damage occurs.

An open door or window detecting device 150 may be provided to temporarily shut down air conditioning system 20 when an outside door or window is left open for more than a preset time. See FIG. 14. The attached air heating or cooling system then runs virtually continuously to try to cool the incoming warm air or warm the incoming cold air. This is often a problem where tenants do not themselves pay for electricity, such as on the ocean, and results in a high electric bill and excessive wear on the attached air heating or cooling system. Open door detecting device 150 may sense an open door with any of several different mechanisms. One such mechanism is an RF Transmitter 152 mounted on the door or window and a signal receiver 154 mounted within apparatus 10. When the transmitter 152 signals an open window or door, apparatus 10 receives the signal through the signal receiver 154, begins a timing cycle of pre-selected duration, and displays or sounds an alert to the occupant. At the end of the cycle, which for example may be five minutes long, the the attached air heating or cooling system control voltages are removed by apparatus 10, the system shuts down until the door or window is closed, and building owner is saved needless electric charges. Alternative sensing mechanisms include infrared light reflection and the sensing means, sonic echo and sensing means and hard wiring to the door or window.

For enhanced monitoring and control of apparatus 10 and the attached air heating or cooling system, computer connecting means 160 and system monitoring and control software (not shown) are optionally provided. These connecting means 160 attach a computer 162 via a standard interface to apparatus 10. The software permits the computer to set, change or view the settings within the apparatus 10 PIC microcontroller. The much larger viewing area of a computer monitor over an LCD permits faster and easier changing and viewing of temperature scheduling settings and of apparatus 10 settings.

Apparatus 10 also preferably includes a backup battery detection circuit 170. See FIG. 18. Circuit 170 monitors the battery BAT voltage and current levels, and if one or both of these levels falls below a pre-set point, circuit 170 displays a message on the LCD alerting the occupant of the condition. If the occupant does not deactivate the alert within a pre-set length of time, the circuit 170 sounds an alarm. Circuit 170 also detects and alerts the occupant of an improperly installed or missing battery BAT.

Figure 20:
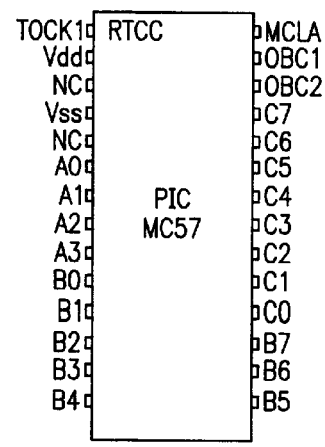
FIG. 20 is a schematic diagram of the filter sensing switch circuit.
Figure 15:
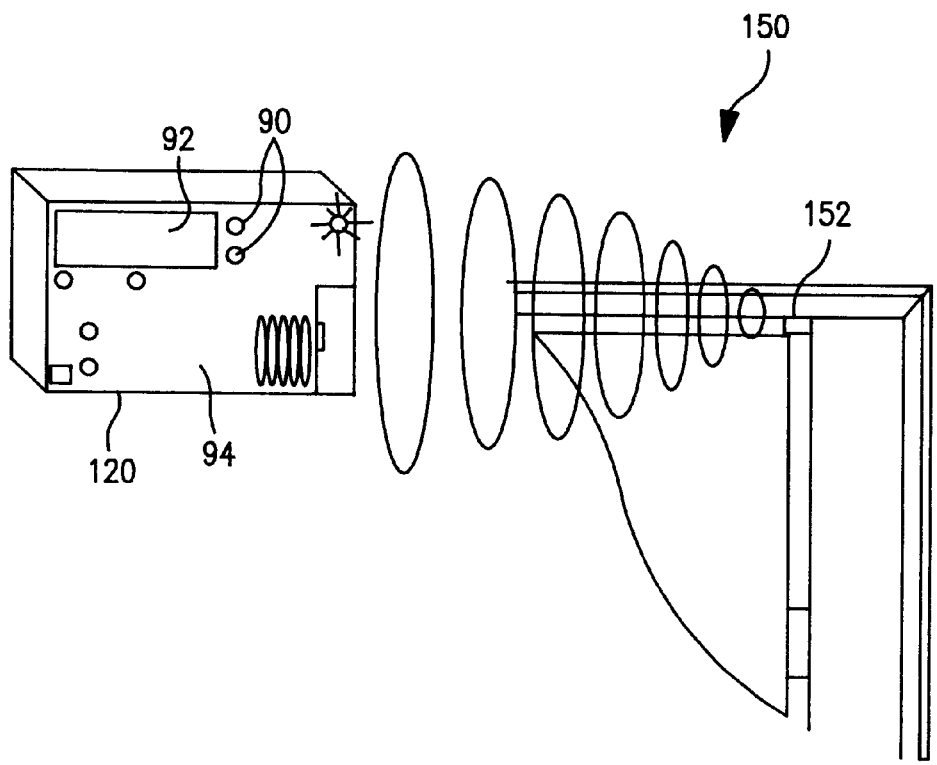
FIG. 15 is a perspective view of the apparatus and a part of a sliding door fitted with a position identifying transmitter sending a signal to the apparatus.
Figure 16:
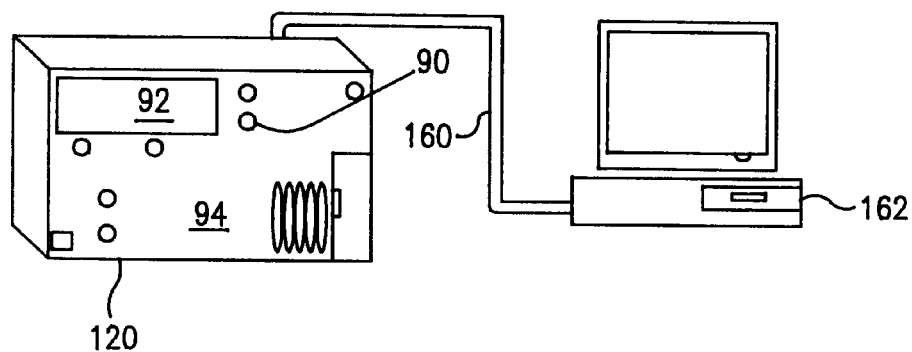
FIG. 16 is a perspective view of the apparatus and a to computer and monitor, and connecting means interconnecting the apparatus and the computer and monitor.

An emergency telephone calling circuit 180 is preferably provided for alerting a remote building occupant, owner or appropriate authorities of any of the above conditions, including fire, excessive condensation, low coolant level, open door or window, dirty filter and low battery power. See FIG. 19. Circuit 180 dials 911, or some other emergency number or a pager and either plays a recorded message or, where a pager is dialed, enters a code identifying the problem. FIG. 20 illustrates the preferred filter sensing switch 192.

Method

In practicing the invention, the following method may be used. The method includes the steps of: the operator selecting and setting a primary period of filter 14 use of a duration assuring replacement before filter 14 clogging; apparatus 10 clock circuit TC counting out the selected primary period; apparatus 10 activating signalling means, such as an annunciator in the form of buzzer BZ1 and a light source in the form of diode LED in an on and off flashing sequence, to signal the operator to replace the filter 14; resetting clock circuit TC to begin the primary period counting cycle again upon replacement of the air handler filter 14; apparatus 10 clock circuit TC counting out a secondary time period measured from the end of the primary time period if filter 14 is not replaced by the end of the primary period; apparatus 10 supplying power to a relay on the circuit 12 mounting board to disrupt the 24 volt control to the system thermostat and thus to shut down the attached air heating or cooling system if the filter 14 is not replaced by the end of the secondary time period; apparatus 10 also preferably causing buzzer BZ1 to generate sounds at faster paced intervals and also preferably causing diode LED to flash at a more rapid rate; detecting a fire in the building and shutting down the air temperature control system. The secondary period preferably, but not necessarily, has a duration of three days.

A conditional step is that of: if the air handler filter 14 is removed and not replaced, the apparatus 10 causing the apparatus remote switch to signal the attached air heating or cooling system not to operate by removing the 24 volt control to the system thermostat. This step is preferably combined with the step of simultaneous activation of diode LED continuously rather than in a series of flashes, and non-activation of buzzer BZ1.

Further conditional steps include those of: the operator turning switch 1 on the apparatus circuit 12 mounting board to the off position to prevent shutdown of the attached air heating or cooling system while apparatus 10 is being installed in a critical area, such that apparatus 10 only generates the reminder signal for the operator; and the operator turning switch 2 on the apparatus circuit 12 mounting board to the on position to test apparatus 10 when the installer or system technician desires to test apparatus 10, such as in the event a malfunction is suspected.

The program embedded in integrated circuit PIC also provides apparatus 10 test sequences. One test sequence begins automatically when apparatus 10 is activated. This is an optional step in which the program counts out a preprogrammed length of time, such as 15 seconds, and then activates the signalling means for a length of time such as 15 seconds, and then actuates the relay, if switch 1 is on, and the buzzer BZ1 sound and diode LED flash are made noticeably more intense.

The operator optionally performs a step of turning switch 3 on the circuit 12 mounting board on to test the loudness of buzzer BZ1. When switch 3 is turned on, buzzer BZ1 sounds continuously and allows the operator to operate switches 4 and 5 to adjust the audio level of buzzer BZ1 appropriately for the environment in which apparatus 10 is installed.

The operator optionally performs the step of turning switches 8, 7 and 6 on the circuit 12 mounting board on to select the number of days making up the primary period. The operator turns on these switches to select 15, 30 or 45 days, respectively, as noted above, or turns off all of these switches to cause the count to default to 60 days. Switches 8, 7 and 6 are prioritized in this same order. For example, if switch 2 is off and switches 8 and 6 are on, the primary period is 15 days because of its priority in the circuit design. The alarm test switch 2 overrides switches 8, 7 and 6.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A monitoring apparatus for an air temperature control system within a building, comprising:

means for setting a primary period of filter use to assure replacement before the filter becomes clogged;

means for setting a secondary period at the end of which the air temperature control system is automatically shut down:

means for counting out the selected primary period;

signalling means to signal the operator to replace the filter, absent replacement of the filter;

means for sensing replacement of the filter;

means for resetting the means for counting to begin the counting out the selected primary and secondary periods again upon replacement of the filter;

means for counting out a secondary period measured from the end of the primary period;

means for shutting down the system at the end of the secondary period absent replacement of the filter; and fire detecting means within the building connected to the monitoring apparatus.

2. The apparatus of claim 1, additionally comprising means for shutting down the air temperature control system upon detection of a fire.

3. The apparatus of claim 1, wherein the fire detecting means comprises temperature measuring means and means for storing and comparing a preset temperature measurement to temperatures measured by the temperature measuring means.

4. The apparatus of claim 1, wherein the fire detecting means comprises smoke detection means.

5. The apparatus of claim 1, wherein the fire detecting means comprises:

a building fire alarm which emits a sound upon detection of a fire; and a sound detecting means.

6. The apparatus of claim 1, wherein the air temperature control system includes a coolant having a coolant level, additionally comprising:

coolant level measuring means and means for storing and comparing a preset coolant level to coolant levels measured by the coolant level measuring means; and means for alerting a building occupant of a measured coolant level below the preset coolant level.

7. The apparatus of claim 1, wherein the temperature control system includes a condensation pan, additionally comprising:

condensation detecting means for detecting condensation within the condensation pan;

means for alerting a building occupant of condensation within the condensation pan upon detection of condensation; and means for shutting down the air temperature control system upon detection of condensation.

8. The apparatus of claim 1, wherein the building has a door which can be pivoted into an open position, additionally comprising:

means for detecting the door is open;

means for alerting a building occupant the door is open;

means for starting a timing cycle programmed with a preset time; and means for shutting down the temperature control system when the door is in the open position for the preset time.

9. The apparatus of claim 8, wherein the means for detecting when the door is in the open position comprises an RF transmitter for generating a signal, the RF transmitter being mounted on the door, and a signal receiver unit mounted on the apparatus for receiving the signal.

10. The apparatus of claim 8, wherein the means for detecting when the door is in the open position comprises infrared light radiating and receiving means.

11. The apparatus of claim 8, wherein the means for detecting when the door is in the open position comprises sound generating and receiving means.

12. The apparatus of claim 1, wherein the building has a window which can be pivoted into an open position, additionally comprising means for detecting the window in the open position, means for alerting a building occupant of the open position of the window; and means for starting a timing cycle programmed with a preset time and means for shutting down the temperature control system when the window is in the open position for the preset time.

13. The apparatus of claim 12, wherein the means for detecting when the window is in the open position comprises:

an RF transmitter for generating a signal mounted on the window; and a signal receiver unit mounted on the apparatus for receiving the signal.

14. The apparatus of claim 12, wherein the means for detecting when the window is in the open position comprises infrared light radiating and receiving means.

15. The apparatus of claim 12, wherein the means for detecting when the window is in the open position comprises sound generating and receiving means.

16. The apparatus of claim 1, wherein the apparatus comprises apparatus controls, additionally comprising:

a computer and monitor;

means for operationally connecting the computer and monitor to the apparatus;

and program means within the computer for operating the apparatus controls through the computer and monitor.

17. The apparatus of claim 1, additionally comprising:

telephone connection means;

memory means for storing a telephone number;

and means for automatically dialing the telephone number on the telephone upon detection of a fire.

18. The apparatus of claim 1, wherein the apparatus includes a battery with a power level, additionally comprising:

means for monitoring the power level in the battery;

means for storing and comparing a preset battery power level measurement to power levels measured by the means for monitoring the power level;

means for alerting a building occupant of a power level below the preset power level measurement; and means for shutting down the temperature control system upon detection of a power level below the preset power level measurement.

19. A monitoring apparatus for alerting an operator to the need go change a filter within an air temperature control system within a building, comprising:

means for setting a primary period of filter use;

means for counting out the primary period;

means for activating operator signalling means;

means for sensing replacement of the filter;

means for resetting the means for counting upon replacement of the filter;

means for counting out a secondary period measured from the end of the primary period;

means for shutting down the system at the end of the secondary period absent replacement of the filter; and fire detecting means within the building to alert building occupants to the presence of the fire and to shut down the air temperature control system.

20. A method of monitoring an air temperature control system comprising the steps of:

setting a primary period of filter use appropriate to assure filter replacement before the filter becomes clogged;

setting a secondary period the ending of which results in automatic shut down of the air temperature control system;

counting out the selected primary period;

activating signalling means at the end of the primary period to signal the operator to replace the filter;

counting out a secondary time period measured from the end of the primary time period;

shutting down the air temperature control system in the absence of filter change;

detecting a fire in the building; and shutting down the air temperature control system when fire is detected.

* * * * *